United States Patent [19]

Sugranes

[11] 4,158,046
[45] Jun. 12, 1979

[54] PROCESS FOR THE CONTINUOUS MANUFACTURE OF SOLID ALKALINE SILICATES

[76] Inventor: Jose F. Sugranes, Calle Serrerias, 57/59 Valencia, Spain

[21] Appl. No.: 791,888

[22] Filed: Apr. 28, 1977

Related U.S. Application Data

[60] Division of Ser. No. 675,217, Apr. 8, 1976, Pat. No. 4,036,583, which is a continuation of Ser. No. 541,689, Jan. 16, 1975, abandoned.

[51] Int. Cl.² ............................................. C01B 33/32
[52] U.S. Cl. .................................................. 423/334
[58] Field of Search .......................... 423/334; 23/279; 432/117, 118; 106/52; 65/347

[56] References Cited

U.S. PATENT DOCUMENTS

| | | | |
|---|---|---|---|
| 1,731,457 | 10/1929 | Fasting | 432/117 X |
| 2,039,062 | 4/1936 | Debuch | 23/279 X |
| 3,171,638 | 3/1965 | Zimmerley et al. | 423/117 X |
| 3,464,683 | 9/1969 | Enk | 432/117 X |

OTHER PUBLICATIONS

"Kirk–Othmer Encyclopedia of Chemical Technology" vol. 18, 1969, pp. 139-141.

*Primary Examiner*—Edward J. Meros
*Attorney, Agent, or Firm*—Wenderoth, Lind & Ponack

[57] ABSTRACT

Solid alkaline silicates are continuously manufactured by the use of a rotary furnace including a tubular body rotating slowly with a slight rake, having an opening for charging the materials at its higher end, a burner at its lower end and several rectangular or squared holes for discharging the product in the lower end of its side wall. In the discharging holes are exteriorly fitted several interchangeable refractory bushings having different passage sections to regulate the product discharging rate according to the viscosity thereof. Preferably, the bushings are made up of two halves and means are provided on the outside of the furnace wall for retaining and positioning the bushings.

1 Claim, 3 Drawing Figures

PROCESS FOR THE CONTINUOUS MANUFACTURE OF SOLID ALKALINE SILICATES

This is a division of application Ser. No. 675,217, filed Apr. 8, 1976, now U.S. Pat. No. 4,036,583 which is a continuation of application Ser. No. 541,689, filed Jan. 16, 1975, now abandoned.

BACKGROUND OF THE INVENTION

The present invention relates to a process including the use of a horizontal rotary furnace for the continuous manufacture of solid alkaline silicates, and more concretely speaking the object of the present invention is to provide a process for operating a rotary furnace of the above-cited type provided with an improved discharging device for the resulting product.

Generally, the obtention of alkaline silicates is based on the fusing of quartz sand (silica) with the carbonate of the corresponding alkaline cation, it being feasible to effect the melting in Bassin furnaces (shaft type), in crucible furnaces, or, in modern times, by means of a continuous process using the above-cited tubular rotary furnaces.

These rotary furnaces consist of a metallic tubular body which is interiorly lined with a refractory material, the length of this tubular body being from 6 to 8 times as great as the interior diameter of the same, and it rotates slowly with a slight rake so that the starting materials are being charged through its higher end and advance owing to the rotation and rake of the furnace and are discharged through the lower end in which, in addition, the burner of the furnace or the heater is arranged.

In the specification hereinafter set forth reference is made preferably to the manufacture of the silicate whose cation is sodium, for the process in itself is similar to that for the remaining silicates (potassium silicate, lithium silicate, etc.), the difference lying solely in the melting temperatures which are fixed by the corresponding binary diagrams and by the molar relationship existing between the silicium anhydride and the oxide of the corresponding cation.

Referring, therefore, to the formation of the sodium silicate in rotary tubular furnaces, the main reaction which takes place is the following:

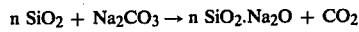

$$n\ SiO_2 + Na_2CO_3 \rightarrow n\ SiO_2.Na_2O + CO_2$$

where n may normally take up any value between 2 and 4, thereby obtaining a range of sodium silicates with distinct molar relationships, with specific characteristics and properties suitable for the applications to which they are destined.

In order that the melting should be perfect it is necessary to make the materials advance through the interior of the furnace at a uniform speed, without stoppages, forming a thin layer and in such a way that the time of stay of the materials within the furnace and the amount of such materials at any time present within the furance should be the indispensable minimum, so that the melting process should take its course in a progressive form between the entrance and the exit of the furnace. Thus, a series of successive stages, i.e., mixing stages, lumpiness stages, reaction and dissolution stages, liquid stage, and discharge stage are produced. During the process, at 750°–800° C. the lumpy state is begun between the silica and the carbonate, while from 800° C. on begins the formation of the liquid stage (eutectic) which is made up of disilicate and quartz (silica), about 800° C. the quartz grains are covered with a layer of metasilicate and disilicate, there taking place a great liberation of carbon dioxide, at which stage the reaction is very rapid and the carbon dioxide carries with it a part of the carbonate and the quartz, thereby forming a thin slag layer which floats on top of the liquid melted mass. At about 1,000° C. the slag is dissolved (carbonate and quartz) in the liquid formed by metasilicate and disilicate, and, finally, about between 1,100° C. and 1,200° C. the gassing of carbon dioxyde ceases since all of the carbonate has reacted.

If the quartz has been previously calculated according to the indicated temperature, it will be totally dissolved within the liquid, and a silicate with the calculated molar ratio will be obtained. But it has to be taken into account that there exist diverse types of silicates which in the melted state possess different viscosities. Thus, it is obvious that if one had to deal with silicates whose melted mass is very thinly liquid, the flowing of the melted material out of the discharge exit of the furnace might be excessively rapid, thereby preventing the melting process from taking its course along the stages or phases hereinbefore mentioned, whereas, if, on the other hand, the melted mass or body is very viscous, the flowing of the melted material out of the exit of the furnace will be delayed, thereby increasing the thickness of the mass in the interior of the furnace. This will render difficult the intermixing of the materials and lead to an imperfect product.

SUMMARY OF THE INVENTION

Hence, the object of the invention is to provide a process for operating a rotary furnace for the continuous manufacturing of solid alkaline silicates, wherein the furnace is fitted with a discharging device which makes it possible to regulate the flow of the melted product out of the discharge exit of the furnace so that in every particular case the product flows out of the exit at the precise speed for the melting process to take place at the optimum conditions explained.

To this purpose, and according to the invention, the discharge of the silicate from the exit of the furnace is achieved by fitting the furnace with several rectangular or square-shaped holes cut in one end of the furnace side wall, in a number varying from one to eight. In these exit holes several bushings made of a refractory material are exteriorly insertable, the bushings presenting different passage sections and being interchangeable. Thus, by providing several bushing sets, the set most suited to the fluidity or viscosity of the melted mass may be used in order to achieve a constant and uniform evacuation of the furnace, thereby providing the advantage that the bushings can be interchanged when it is required to change the type of silicate to be manufactured without being compelled to let the furnace cool down.

BRIEF DESCRIPTION OF THE DRAWINGS

Other objects and features of the present invention will be described in connection with the attached drawings, showing by way of example only one embodiment of the furnace which may be employed in performing the process of the invention, and wherein.

DETAILED DESCRIPTION OF THE INVENTION

Figure 1:
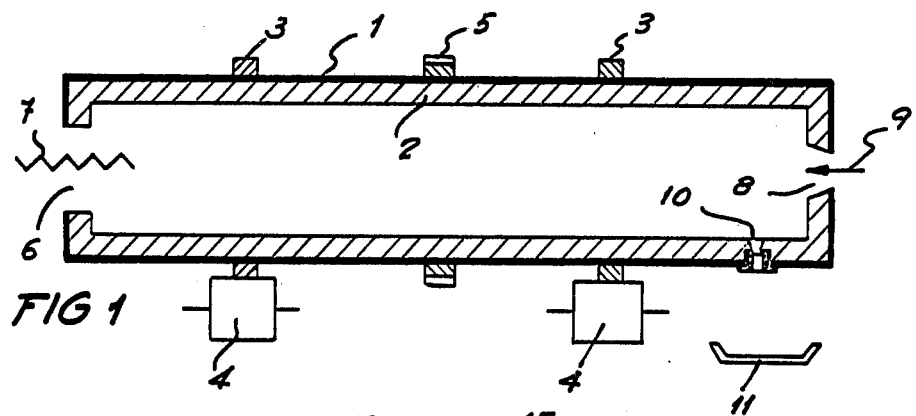
FIG. 1 is a schematic longitudinal section of a rotary furnace employable according to the present invention.

The rotary furnace shown in FIG. 1 is in the form of a metallic tubular body 1 provided with an interior lining 2 of a refractory material, the length of tubular body 1 being from six to eight times as great as the useful interior diameter thereof, which in turn depends on the anticipated capacity of production of the furnace. Externally, tubular body 1 carries several rings 3 by means of which the tubular body is supported by corresponding support rollers 4 and on which the tubular body is enabled to rotate. Tubular body 1 also carries a third ring in the form of a gear 5 which serves to rotate the furnace by interengagement with a suitable gear system not shown, at a slow speed, approximately from ¼ to 1 revolution per minute.

The furnace is mounted such that the axis thereof is at a slight rake or incline, such rake being variable between 0.5% to 2%. On its higher end the furnace possesses a large opening 6 for the charging of the materials, such operation being effected by conventional means shown schematically at 7. The opposite end or lower end of the furnace is closed and possesses a central conical opening 8 within which is lodged a burner or some other suitable heating element shown by the arrow 9. Adjacent the lower end, the furnace has, cut in its periphery or side wall, several openings 10 which may be square-shaped or rectangular and the number of which may vary from one to eight. The melted product flows out of these openings into a casting mould 11, the metallic plates of which are jointed, and in which the product solidifies.

Owing to the slight rake of the furnace and to the slow rotational speed thereof, the reacting mass forms a fine layer which lines the periphery of the furnace and moves forward towards the discharge zone, thereby achieving that the time of stay of the product in the furnace interior be a minimum of between ½ and 1½ hours. This time span is governed by the inclination or rake and the rotational speed of the furnace and by the exit or discharge holes as well.

These exit or discharge openings or holes 10 for the flowing discharge of the material have, in the inner half of the thickness of the side wall 2 of the furnace, a converging form similar to a cone 12, and, in the outer half of the thickness of the side wall a prismatic undercut or countersunk configuration 13. Joining sections 12 and 13 is a shoulder 14. Into undercut sections 13 are inserted interchangeable bushings 15, of a refractory material with a high content of $Al_2O_3$ in order to avoid wear. The bushings have externally equal forms and dimensions in order to fit into the undercut sections 13 and have external peripheral flanges 16 which abut against the surface of the body 1.

Bushings 15 are provided with a central opening 17 which also is square-shaped or rectangular. The dimensions of openings 17 are distinct in such a way that by having at one's disposal several sets of bushings of different interior passage dimensions and cross-sections, that set the dimensions of which are most suitable with regard to the viscosity of the particular silicate to be manufactured can be inserted.

Figure 2:
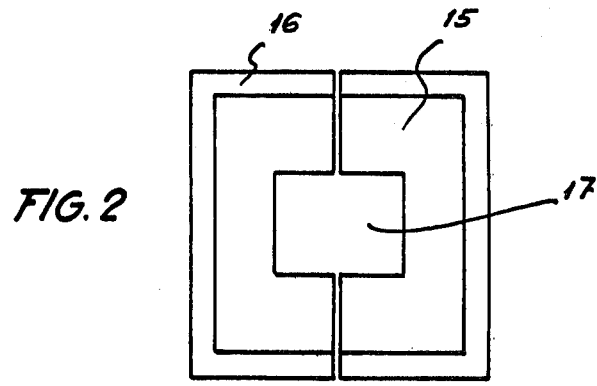
FIGS. 2 and 3 are, respectively, a plan view and a cross-sectional elevational view of one of the bushings used and the mounting thereof.
Figure 3:
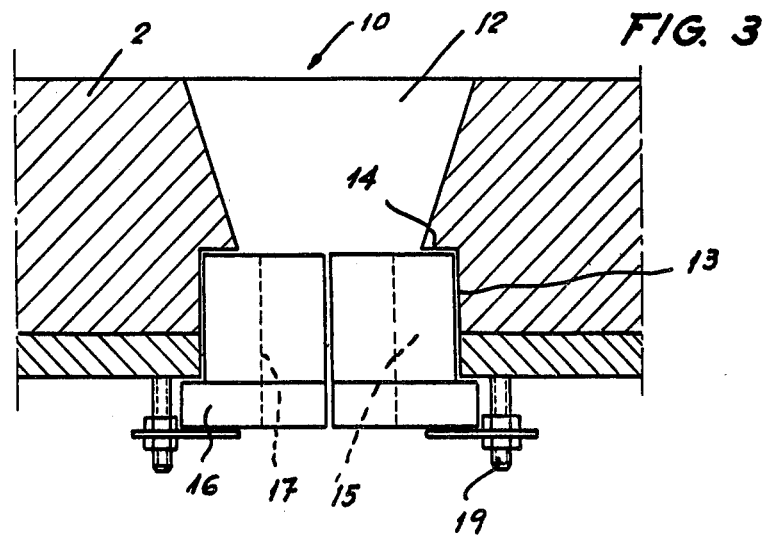

Although each bushing 15 may be in the form of one single piece, it is preferably made up of two halves, as shown in FIGS. 2 and 3. This provides for ease of insertion and removal and allows, in the event of a partial deterioration, the replacement of one of the two parts, with the consequent sparing of bushing material.

The retaining of the bushings 15 in their positions may be done by any suitable means, for instance by means of clamps 18 fastened by means of screws 19 which allow easy assembly and disassembly. Thereby, and due to the insertion of the bushings from the outer part of the furnace, replacement of the bushings by others with a different cross-sectional passage 17, when it is desired to manufacture another distinct type of silicate without having to let the furnace cool down, is facilitated.

What is claimed is:

1. In a process for the continuous manufacture of solid alkali metal silicates, said process comprising providing a rotary furnace including an inclined rotary tubular body having a higher end, a lower end, and discharge means in the wall of said body at a position adjacent said lower end, said body being free of openings between said discharge means and said higher end, supplying silica and an alkali metal carbonate into said body through an opening in said higher end thereof, supplying heat to the interior of said body through said lower end thereof, while rotating said body, and progressively heating said silica and alkali metal carbonate to a temperature of approximately 1200° C. during passage thereof through the length of said body, to thereby form a reaction melt of alkali metal silicate, and continuously discharging said melt through said discharge means, the improvement comprising:

providing said discharge means as at least one outlet opening formed through the side wall of said body and a plurality of bushings selectively interchangeably positionable in each said at least one outlet opening, with each said bushing having therethrough an open passage smaller than said outlet opening, and with said open passages of said bushings being of different sizes; and prior to said steps of supplying silica and an alkali metal carbonate, of supplying heat, and of rotating said body, selecting and inserting within each said at least one outlet opening a predetermined respective said bushing, the size of the open passage thereof being selected as a function of the viscosity of the said melt to thereafter be formed and of the speed of rotation and inclination of said body during such melt formation, to thereby control the rate of flow of said melt through said body, the level of said melt within said body and the rate of discharge of said melt from said body, such that said rate of discharge corresponds to the rate of melting and reaction of said silica and alkali metal carbonate to form said melt of alkali metal silicate within said body.

* * * * *